W. F. BONDS.
CRUTCH.
APPLICATION FILED SEPT. 19, 1917.
1,265,993.
Patented May 14, 1918.
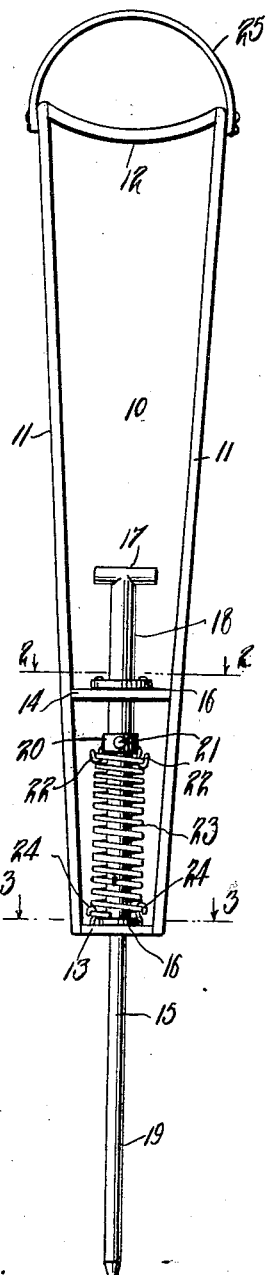
FIG. 1.
FIG. 2.
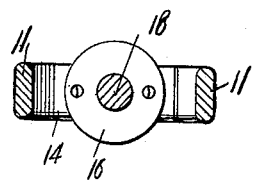
FIG. 3.
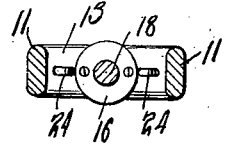
WITNESSES
W. C. Fielding
A. Hollingsworth
INVENTOR
William F. Bonds
BY Richard B. Owen.
ATTORNEY

UNITED STATES PATENT OFFICE.

WILLIAM F. BONDS, OF TUCUMCARI, NEW MEXICO.

CRUTCH.

1,265,993.        Specification of Letters Patent.       Patented May 14, 1918.

Application filed September 19, 1917. Serial No. 192,180.

*To all whom it may concern:*

Be it known that I, WILLIAM F. BONDS, a citizen of the United States, residing at Tucumcari, in the county of Quay and State of New Mexico, have invented certain new and useful Improvements in Crutches, of which the following is a specification.

This invention relates to improvements in crutches and has for its principal object to provide a crutch for the lame which shall be simple in construction, light in weight and provided with means whereby the lower end of the crutch may be raised out of contact with the ground by the hand without necessitating movement of the upper portion of the crutch which in ordinary forms require the shoulder of the user to be raised at the same time. The crutch is also provided with resilient means between the ground and the shoulder by which the user is enabled to travel a greater distance and with less fatigue in a given time than is possible with the crutch as ordinarily constructed.

With the above as the principal object in view the invention consists in the novel construction, combination and arrangement of parts hereinafter described, pointed out in the appended claim, and illustrated in the accompanying drawings, in which—

Figure 1 is a side elevation of the improved crutch.

Fig. 2 is a cross sectional view on the line 2—2 of Fig. 1, and

Fig. 3 is a similar view on the line 3—3 of the same figure.

In the drawing, 10 indicates the main frame of the crutch formed as usual with two longitudinal bars 11 slightly converging from the upper to their lower ends and connected together at the top by a downwardly curved cross brace 12 which fits under the arm as usual in crutches. The lower end of the crutch which terminates about eighteen inches or two feet from the ground is also connected by a straight cross piece 13. A brace strip 14 connects the two side pieces 11 a short distance above the bottom piece 13 and through these two pieces or strips are formed holes for the passage therethrough of a straight staff 15 that extends from some convenient point above the cross piece 14 to the ground. The cross pieces 13 and 14 may be strengthened by metal disks 16 screwed or bolted thereto as shown.

The staff 15 has a T or other shaped head 17 to form a grip for the user of the crutch and slides freely through the two cross pieces, the upper end being of slightly greater diameter as at 18 than the lower end 19, a shoulder being thus formed to bear under normal conditions against the bottom cross piece 13 or the disk 16 secured thereto. Slidable on the staff 15 between the cross pieces 13 and 14 is a collar 20 adapted to be secured to the staff by a thumb screw or bolt 21 passing through the collar and engaging the staff, said collar having at opposite sides thereof hook shaped members 22 over which is secured one end of a coil spring 23, the lower end of which spring is engaged with hooks 24 projecting upwardly from the cross piece 13 or the disk 16 thereon. A strap 25 may be attached to the upper end of the crutch as shown to pass over the shoulder of the user. This, however, is not necessary but adds to the convenience of the person employing the crutch and enables him to release his hand from the staff without losing the crutch.

By means of this crutch a person can walk faster without greater exertion and with less fatigue to the arms and shoulder than with the ordinary crutch, and by having a spring connection or buffer in the length of the crutch fewer shocks and jars are felt by the shoulder; the cost of manufacture is but little more than the ordinary crutch and is more flexible in use. By loosening the set screw 21 the staff 16 may be rotated to set the handle 17 at any angle most convenient for the user and when walking with the crutch instead of raising the entire crutch and shoulder when moving the crutch forward, the hand draws up the staff and so lifts the lower end from the ground. The staff may be entirely withdrawn from the frame 10 should it be necessary for repairs thereto or to the spring 23.

I claim:

A crutch comprising a frame having a bottom and an intermediate cross piece at the lower end of said frame, a staff forming the lower end of the crutch slidable through openings in the bottom and intermediate cross pieces, the lower end of said staff slidable through the bottom cross piece being of slightly less diameter than the upper end immediately above said cross piece and so form a stop shoulder to abut against the bottom cross piece, a hand grip on the upper end of the staff, an expansion spring connected at its lower end to said frame, and an adjustable collar on the staff to which the upper end of said spring is attached, said spring forming a yielding buffer between the staff and the frame and through the adjustability of the collar the resiliency of said buffer may be adjusted to the weight of the user of the crutch.

In testimony whereof I affix my signature in presence of two witnesess.

WILLIAM F. BONDS.

Witnesses:
FRANCIS E. TOBIN,
GEORGE A. UNDERWOOD.

Copies of this patent may be obtained for five cents each, by addressing the "Commissioner of Patents, Washington, D. C."